(12) United States Patent
Azenkot et al.

(10) Patent No.: US 9,071,521 B2
(45) Date of Patent: *Jun. 30, 2015

(54) SYSTEM AND METHOD FOR THROUGHPUT ENHANCEMENT

(71) Applicant: Marvell International Ltd., Hamilton (BM)

(72) Inventors: Yehuda Azenkot, San Jose, CA (US); Zvi Bernstein, San Jose, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/091,295

(22) Filed: Nov. 26, 2013

(65) Prior Publication Data

US 2014/0086087 A1    Mar. 27, 2014

Related U.S. Application Data

(63) Continuation of application No. 13/152,279, filed on Jun. 3, 2011, now Pat. No. 8,593,992.

(60) Provisional application No. 61/377,091, filed on Aug. 26, 2010.

(51) Int. Cl.
*H04L 12/26* (2006.01)
*H04L 12/841* (2013.01)

(52) U.S. Cl.
CPC ............ *H04L 43/0888* (2013.01); *H04L 43/08* (2013.01); *H04L 43/0847* (2013.01); *H04L 47/28* (2013.01)

(58) Field of Classification Search
None
See application file for complete search history.

(56) References Cited

U.S. PATENT DOCUMENTS

| | | | |
|---|---|---|---|
| 6,442,129 B1* | 8/2002 | Yonge et al. | 370/204 |
| 7,215,646 B2* | 5/2007 | Pietraski et al. | 370/252 |
| 7,719,999 B2* | 5/2010 | Fu et al. | 370/252 |
| 8,238,226 B2* | 8/2012 | Sudo | 370/208 |
| 2002/0097780 A1* | 7/2002 | Odenwalder et al. | 375/146 |
| 2005/0288062 A1* | 12/2005 | Hammerschmidt et al. | 455/562.1 |
| 2008/0165715 A1* | 7/2008 | Liu | 370/311 |
| 2009/0310533 A1* | 12/2009 | Zheng et al. | 370/328 |
| 2011/0007731 A1* | 1/2011 | Tsatsanis et al. | 370/343 |

* cited by examiner

*Primary Examiner* — Hong Cho

(57) ABSTRACT

A method in a first node of a network comprises computing a packet duration when using a first unicast profile with a first type preamble and a packet duration when using a second unicast profile with a second type preamble; comparing the computed packet durations so as to determine one from the first and second unicast profiles which yields a shorter duration; and sending the packet to a second node by using the determined unicast profile.

20 Claims, 9 Drawing Sheets

SYSTEM AND METHOD FOR THROUGHPUT ENHANCEMENT

PRIORITY REFERENCE TO PRIOR APPLICATION

This application claims priority to and is a continuation of U.S. patent application Ser. No. 13/152,279, filed on Jun. 3, 2011, which claims priority to and is a non-provisional of U.S. Patent Application No. 61/377,091, filed on Aug. 26, 2010, all of which are incorporated by reference herein for all purposes.

This invention relates generally to receivers and more particularly, but not exclusively, provides a method and apparatus for throughput enhancement in a Multimedia Over Coax Alliance (MoCA) system via the use of multiple unicast profiles.

BACKGROUND

The MoCA 2.0 standard defines Modulation Profiles that have a set of parameters that determines the transmission between nodes, including preamble type, cyclic prefix length, modulations per subcarrier and transmit power. Each MoCA 2.0 Node maintains two PHY profiles for each 100 MHz unicast link: one for Nominal Packet Error Rate of 1e-6 (NPER) and one for Very Low Packet Error Rate of 1e-8 (VLPER). Similarly, two PHY profiles are maintained for 100 MHz Greatest Common Density (GCD) or Broadcast profiles: one for NPER (1e-6) and one for VLPER (1e-8). The GCD is a modulation format computed by a node for transmission to multiple recipient nodes. For the GCD or Broadcast format, the modulation used for each subcarrier is chosen to be the greatest possible modulation density that is less than or equal to the modulation density for that subcarrier as reported in the most recent Error Vector Magnitude (EVM) Probe Report the node sent to each of the other nodes. The EVM probe is used to determine the optimum modulation scheme for a set of subcarriers. During a new Node admission procedure, PHY profiles for both NPER and VLPER are distributed. Since the VLPER packets are more robust to errors than the NPER packets, the modulations per subcarrier of the VLPER profile are usually equal or lower than the corresponding modulations per subcarrier of the NPER profile.

However, the MoCA 2.0 standard does not support the use of two separate unicast high-speed profiles for each of NPER and VLPER packets. For each type of profile, either a Type5 preamble or a Type 6 preamble can be used, but not both.

Accordingly, a system and method to increase throughput via the use of multiple profiles may be desirable.

SUMMARY

Embodiments of the invention provide a system (node) and method for increasing throughput.

Specifically, according to an embodiment of the invention, a method in a first node of a network comprises computing a packet duration when using a first unicast profile with a first type preamble and a packet duration when using a second unicast profile with a second type preamble; comparing the computed packet durations so as to determine one from the first and second unicast profiles which yields a shorter duration; and sending the packet to a second node by using the determined unicast profile.

According to an embodiment of the invention, a method in a second node of a network comprises receiving a channel estimation signal from a first node; estimating characters of a channel between the first and the second node; determine a modulation type of each subcarrier for each unicast profile based on the channel estimation; generating and sending to the first node a channel estimation report indicating the determined modulation type of each subcarrier for each unicast profile.

According to an embodiment of the invention, a node in a network comprises a processing unit configured to compute a packet duration when using a first unicast profile with a first type preamble and a packet duration when using a second unicast profile with a second type preamble, the processing unit is further configured to compare the computed packet durations so as to determine one from the first and second unicast profiles which yields a shorter duration; a transmitter coupled to the processing unit and configured to send the packet to the other node by using the determined unicast profile.

According to an embodiment of the invention, a node in a network comprises a receiver configured to receive a channel estimation signal from one other node; a processing unit configured to estimate characters of a channel between the node and the other node, determine a modulation type of each subcarrier for each unicast profile based on the channel estimation and generate a channel estimation report indicating the determined modulation type of each subcarrier for each unicast profile; a transmitter configured to send the generated channel estimation report to the other node.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
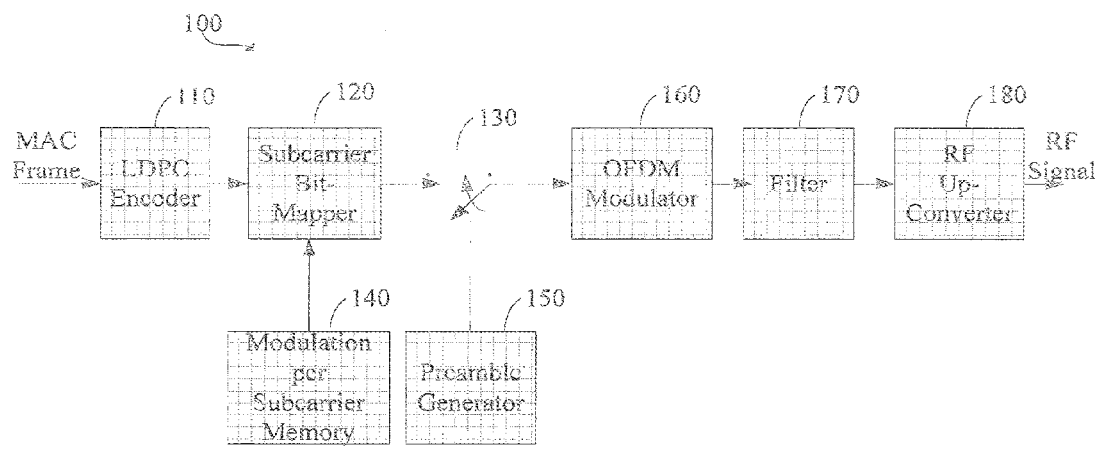
FIG. 1 is a block diagram illustrating a transmitter according to an embodiment of the invention.

FIG. 1 is a block diagram illustrating a transmitter 100 according to an embodiment of the invention. The transmitter 100 comprises a Low-Density Parity Check (LDPC) error correction encoder 110 coupled to a subcarrier bit-mapper 120, which receives input from a modulation per Subcarrier memory 140. An appender 130 receives input from the bit-mapper 120 and a preamble generator 150. Output of the appender 130 goes to an Orthogonal Frequency Division Multiplexing (OFDM) modulator 160, which outputs to a Filter 170 and then a RF Up-Converter 180.

During operation of the transmitter 100, an input Media Access Control (MAC) frame is first encoded via the Low-Density Parity Check (LDPC) error correction encoder 110. Then, a resulting serial bit stream is assigned to subcarriers according to the modulation profile given in the modulation per subcarrier memory 140 and finally mapping the bits assigned to each subcarrier to the appropriate Quadrature Amplitude Modulation (QAM) by the mapper 120. The preamble sequence generated by the preamble generator 150 is appended to the beginning of each packet by the appender 130. The stream of complex numbers input by the appender 130 to the OFDM modulator 160 are converted to time domain samples by computing an Inverse Fast Fourier Transform (IFFT) on a block of 512 complex numbers. Cyclic prefix samples are inserted at the beginning of each OFDM symbol. The cyclic prefix samples are generated from the last Number of Cyclic Prefix ($N_{CP}$) samples of the IFFT output which are copied and prepended to form one OFDM symbol. Then, the stream of samples is filtered by the filter 170 and up-converted to the appropriated RF frequency by the up-converter 180.

Figure 2:
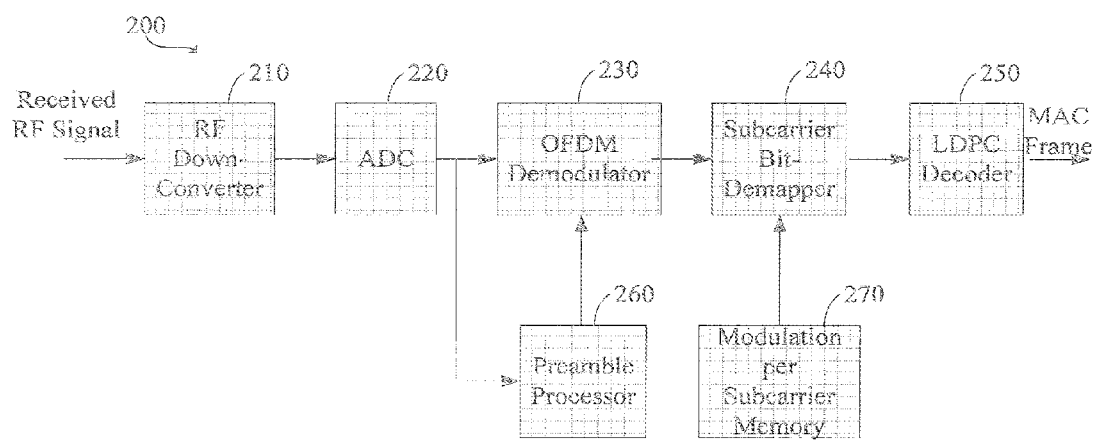
FIG. 2 is a block diagram illustrating a receiver according to an embodiment of the invention.

FIG. 2 is a block diagram illustrating a receiver 200 according to an embodiment of the invention. The receiver 200 comprises a RF downconverter 210 coupled to an analog to digital converter (ADC) 220, which outputs to a OFDM demodulator 230 and a preamble processor 260, which also outputs to the demodulator 230. In an embodiment, the ADC 220 comprises two ADCs, one for I and one for Q streams. The demodulator 230 outputs to a subcarrier bit-demapper 240, which received input from a modulation per subcarrier memory 270. The demapper 240 outputs to a LDPC decoder 250.

During operation of the receiver 200, the down-converter 210 filters and down-converts a received RF to baseband. The signal is converted to digital samples via two ADCs 220 for the I and Q paths. First the preamble processor 260 uses the preamble to adjust the signal level, detect the received signal, estimate and correct any carrier frequency offset that the received signal may have, and estimate the channel based on the channel estimation (CE) portion of the preamble. The OFDM demodulator 230 converts the received samples to frequency domain via a Fast Fourier Transform (FFT). The complex samples of each subcarrier are equalized using the equalizer coefficients obtained from the channel estimation based on the CE. Then, the equalized complex samples are converted to up to 10 values of Log-Likelihood Ratio (LLR) according to the modulation profile per subcarrier obtained from the modulation per subcarrier memory 270. The LLR values are the soft values needed for LDCP decoding. The LDPC decoder corrects 250 any error that the received PHY frame may have and sends the decoded frame to the MAC block.

The modulation used on each subcarrier (i.e., the value of b, as described further below) is specified in the modulation profile in the memory 270, also sometimes called the bit-loading table. This table is set during profiling for each pair of transmitting and receiving nodes.

The modulation profile contains 480 values of b, one for each subcarrier: $b_i$ is the value at subcarrier i, where it represents the size of the modulation in bits, running from 1 for Binary Phase Sift Keying (BPSK), 2 for Quadrature Phase Shift Keying (QPSK), 3 for 8-(Quadrature Amplitude Modulation) QAM, through 10 for 1024-QAM. For any subcarriers for which bi=0, no demapping is needed because no data were loaded onto the subcarrier. There are 32 subcarriers that always contain zeros. These are called unavailable subcarriers. Any additional nulls in the modulation profile are called unused subcarriers.

The MOCA 2.0 standard defines two types of unicast high-speed profiles, one for NPER and another one for VLPER. The unicast profiles support a mode of unicast profiles which can use either Type P5 preamble or Type P6 preamble. Type P5 preamble uses one CE-symbol and Cyclic Prefix (CP) of 192 samples preceding it and Type P6 preamble uses two CE symbols and Cyclic Prefix (CP) of 192 samples preceding them.

Conventionally, the MoCA 2.0 standard allows the use of only one NPER unicast profile; either Type P5 preamble, or Type P6 preamble, but not both. Similarly, since the standard allows the use of only one VLPER unicast profile, it can use either Type P5 preamble, or Type P6 preamble, but not both.

Figure 3:
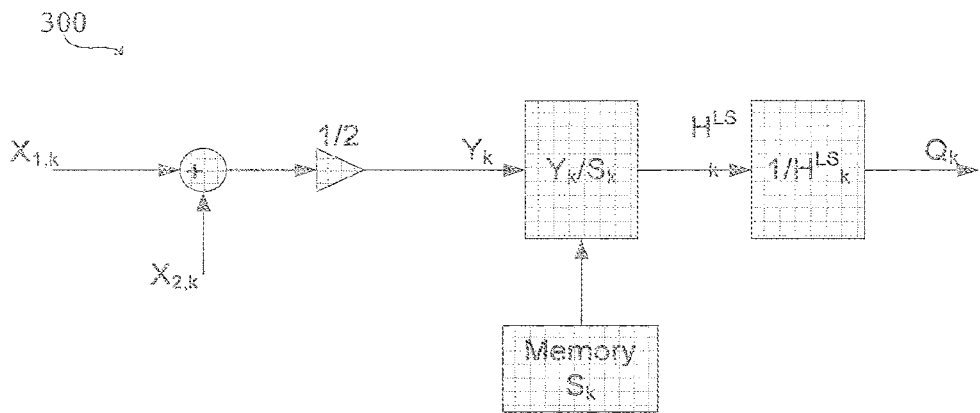
FIG. 3 is a block diagram illustrating a channel estimator and equalizer for a Type P6 preamble.
Figure 4:
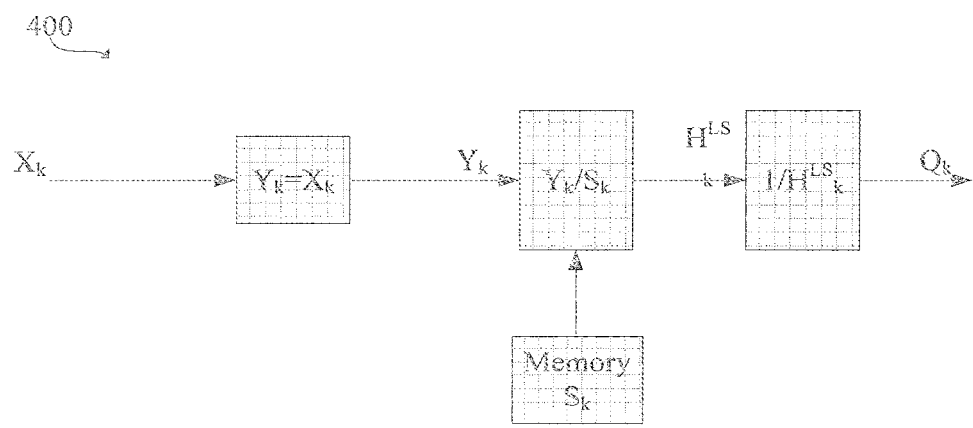
FIG. 4 is a block diagram illustrating a channel estimator and equalizer for a Type P5 preamble.

FIG. 3 and FIG. 4 are block diagrams illustrating a channel estimator and equalizer for a Type P6 preamble and P5 preamble, respectively.

The channel estimation is obtained from the training sequences called CE which are part of the preamble. The standard channel estimation is done as follows:

For Type P6 preamble, where two identical CE symbols are available, the two CE symbols are first averaged after being converted to the frequency domain $$Y_k = (X_{1,k} + X_{2,k})/2 \qquad \text{Equation 1}$$

For Type P5 preamble, where only one CE symbol is available, there is no CE symbols averaging. The received samples of the CE are converted to the frequency domain obtaining $X_k$, k=-N/2, ..., N/2-1

$$Y_k = X_k \qquad \text{Equation 2}$$

The least squares estimation of the channel frequency response per subcarrier is given by $$H_k^{LS} = \frac{Y_k}{s_k} \qquad \text{Equation 3}$$

The channel frequency response estimate can be improved by using the frequency domain correlation and the time domain correlation of the channel frequency response. The improved channel frequency response is generally a linear combination of the least squares channel coefficients, $H_k^{LS}$. As is shown later, the phase error of the channel coefficients due to the residual CFO is fixed per subcarrier; thus, the improvement of the channel estimate is not affected by the fixed phase error. We will not address here the use of the correlation of the channel response to improve the channel estimation.

The equalizer coefficients, $Q_k$, per each subcarrier k are estimated via $$Q_k = \frac{1}{H_k^{LS}} \qquad \text{Equation 4}$$

First the frequency domain tones (or subcarriers) of the received two CE symbols are averaged by summing and dividing by 2. Then, the estimated channel frequency response per subcarrier is obtained by dividing each $Y_k$ by the transmitted data of the CE symbol, $s_k$, retrieved from a memory. The equalizer coefficients are obtained by inverting the channel coefficients.

Figure 5:
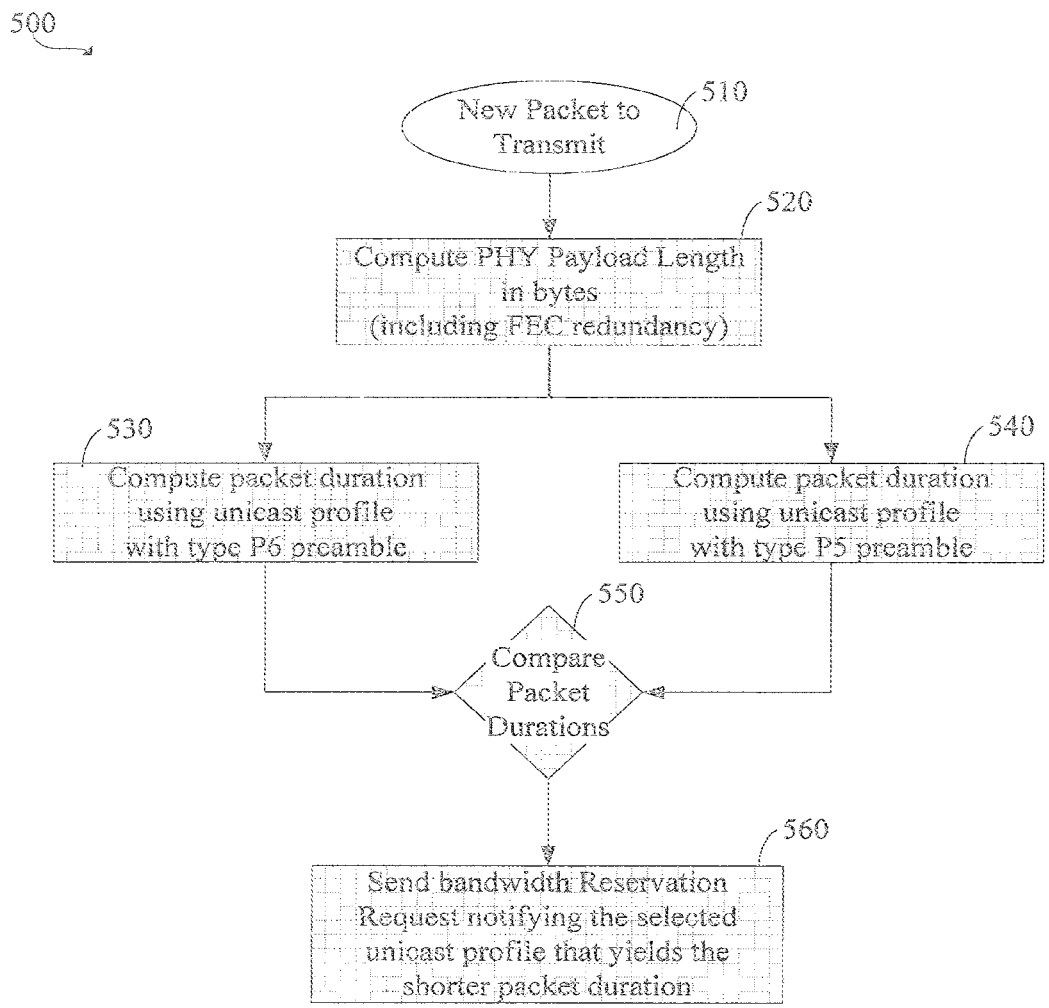
FIG. 5 is a flowchart illustrating a method of selecting a unicast high-speed profile.
Figure 6:
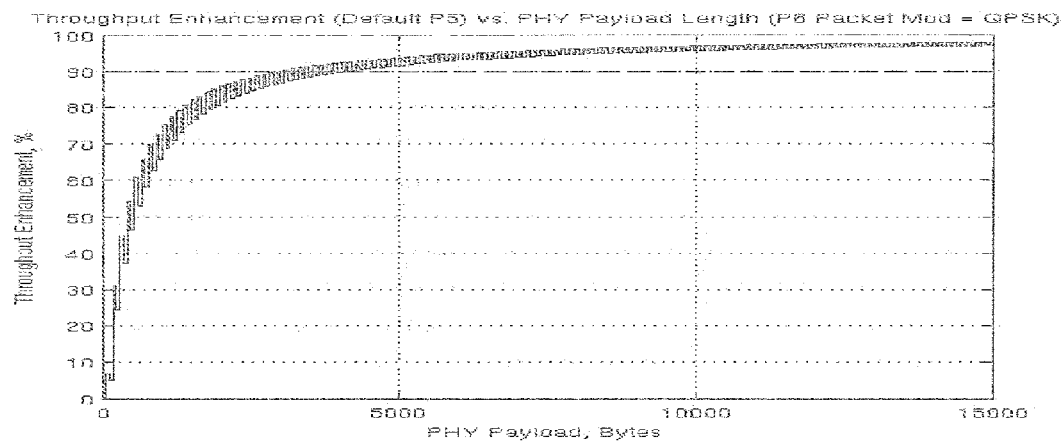
FIG. 6-FIG. 23 are plots illustrating throughput enhancement.
Figure 7:
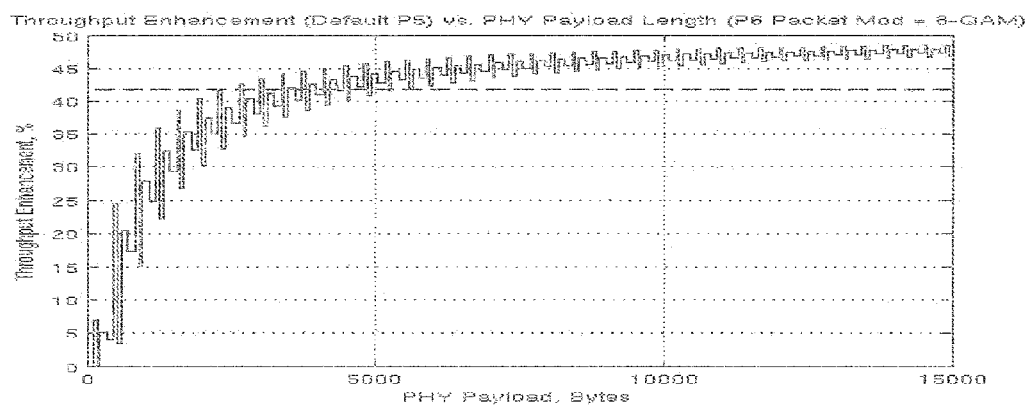
Figure 8:
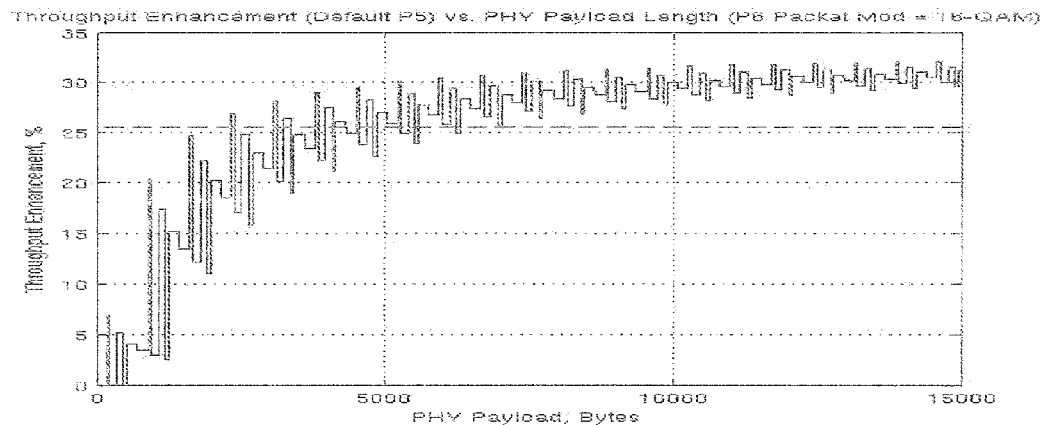
Figure 9:
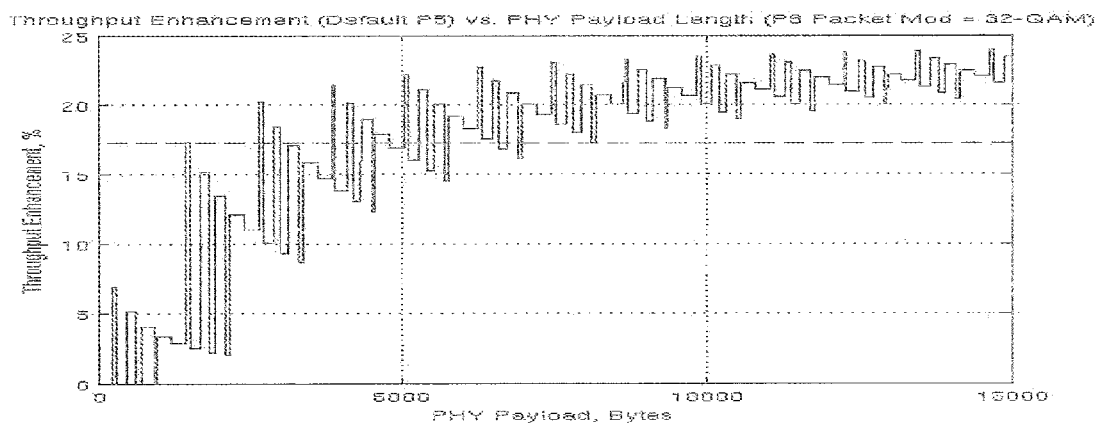
Figure 10:
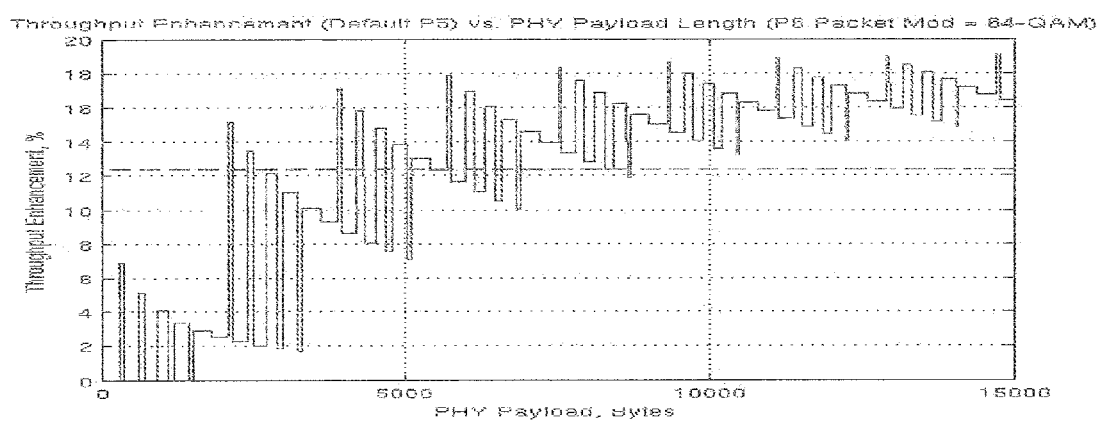
Figure 11:
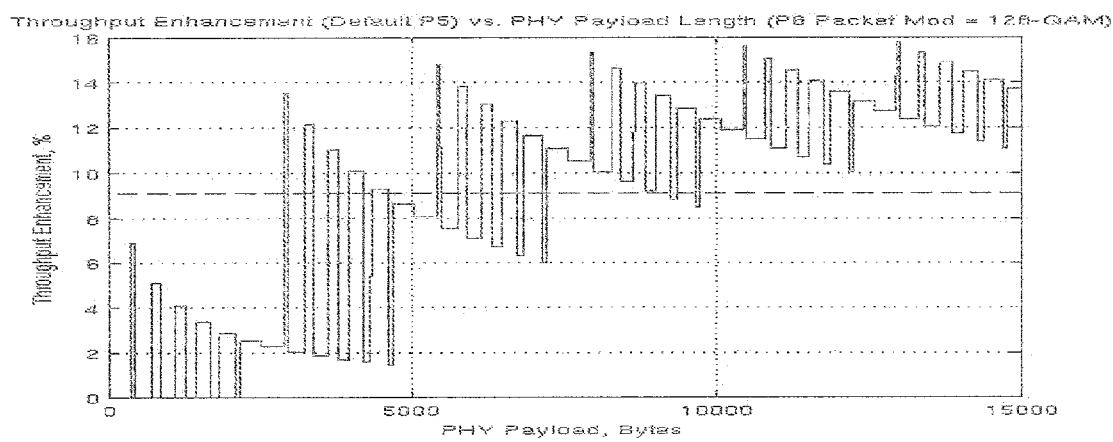
Figure 12:
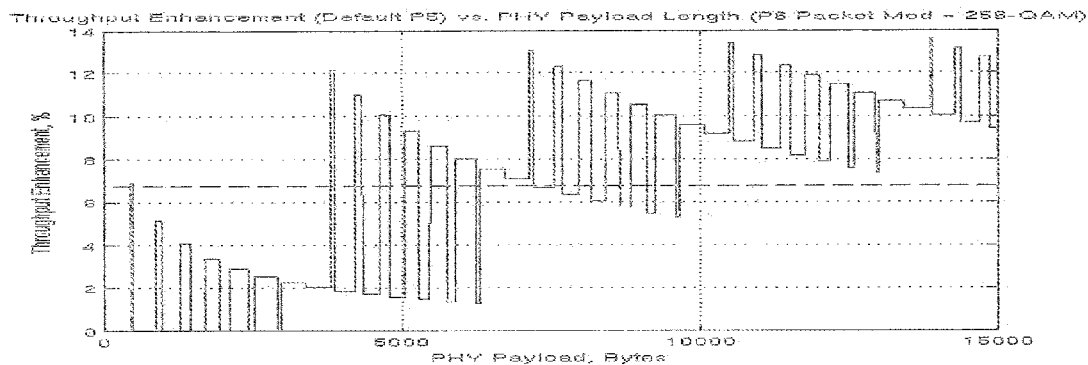
Figure 13:
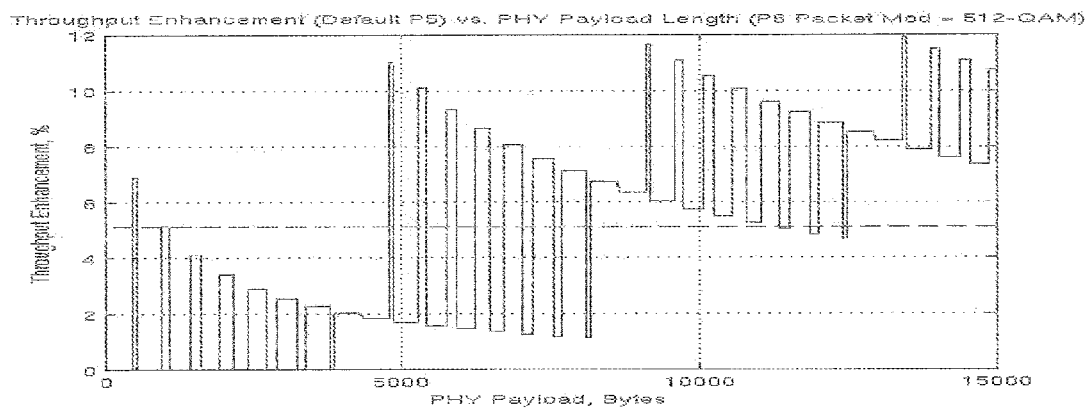
Figure 14:
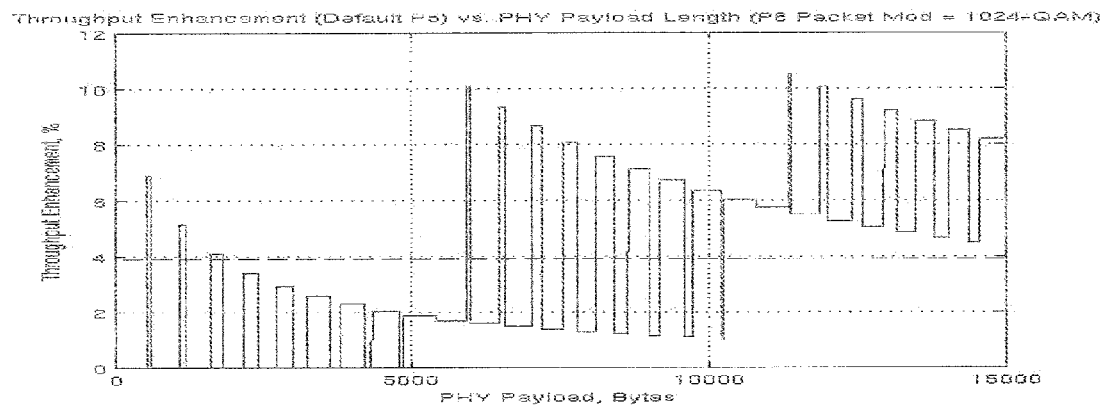
Figure 15:
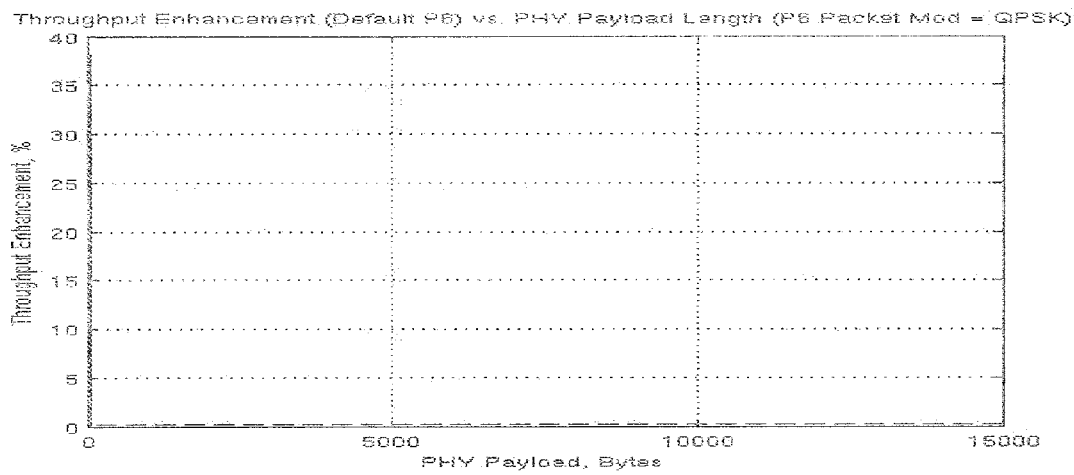
Figure 16:
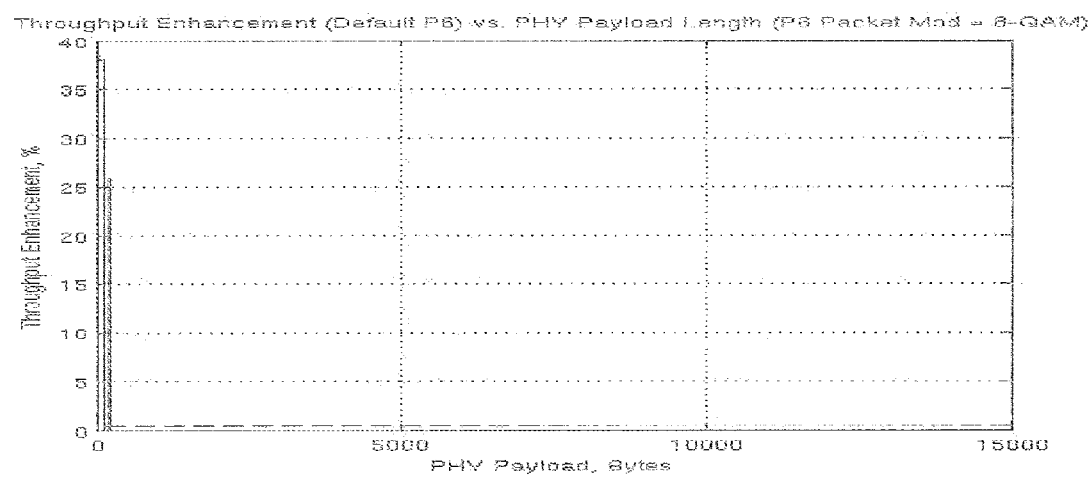
Figure 17:
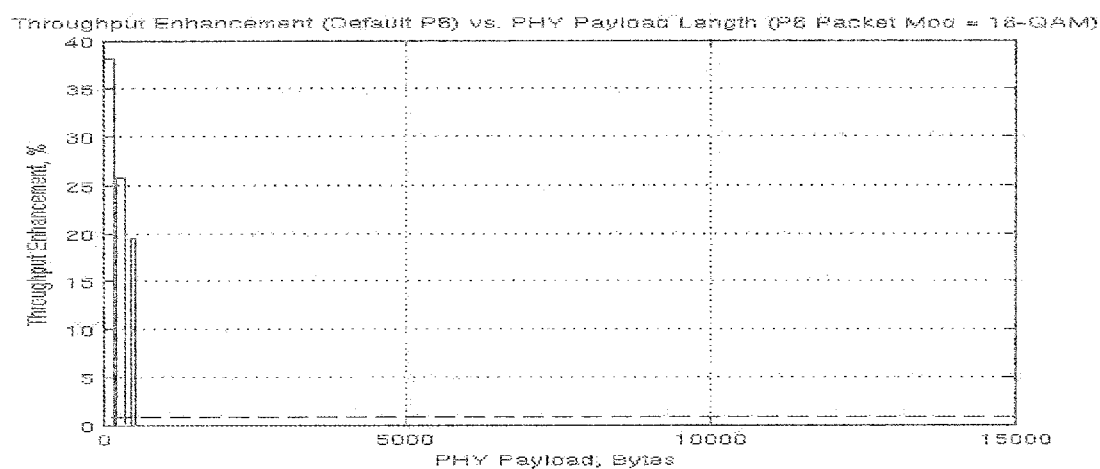
Figure 18:
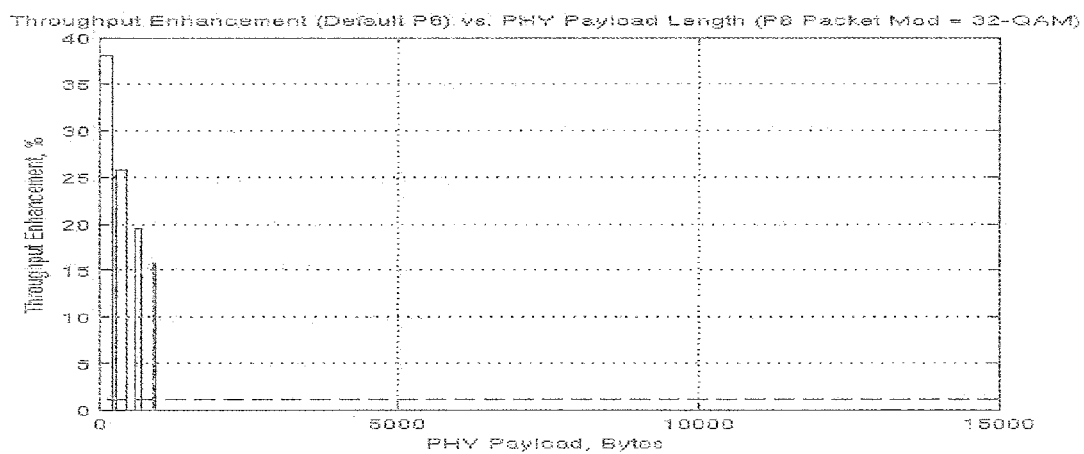
Figure 19:
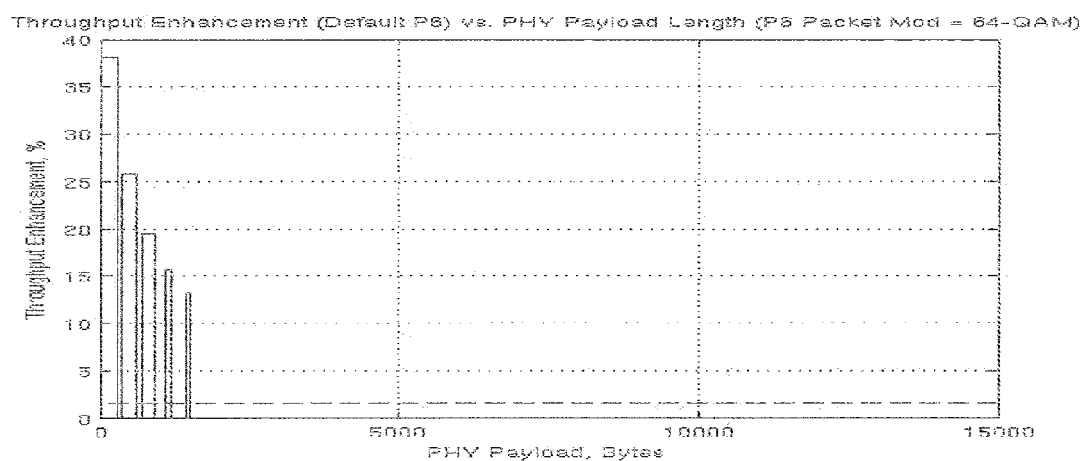
Figure 20:
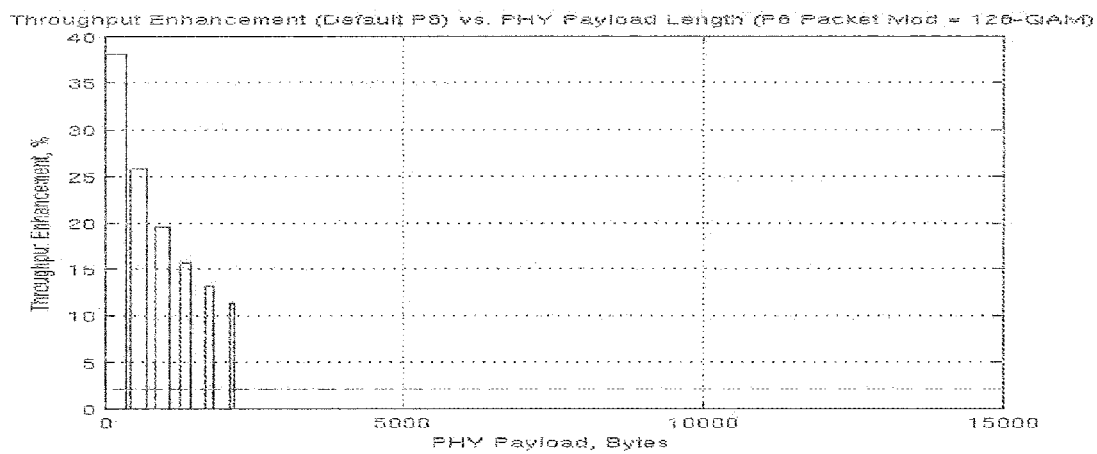
Figure 21:
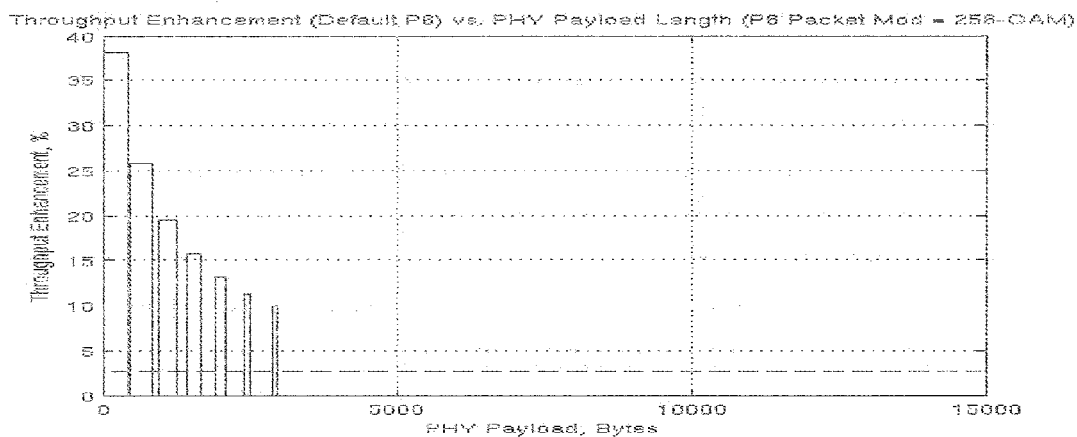
Figure 22:
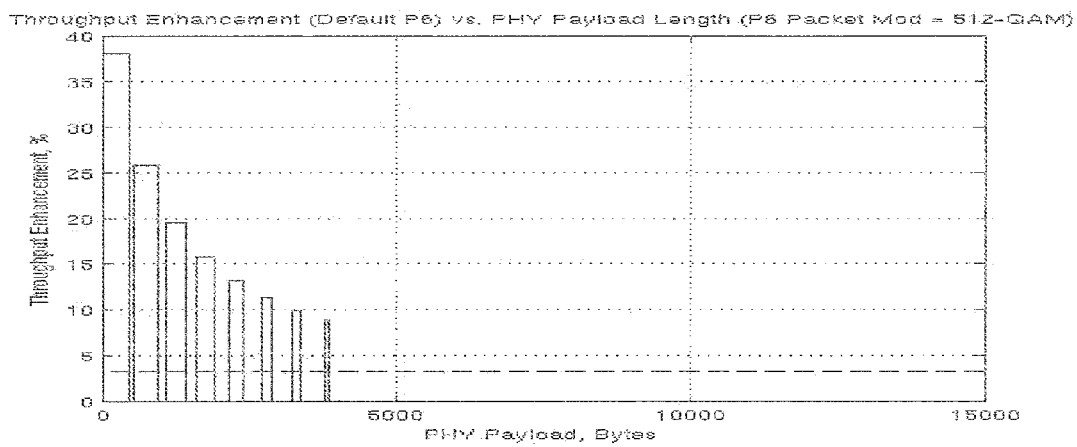
Figure 23:
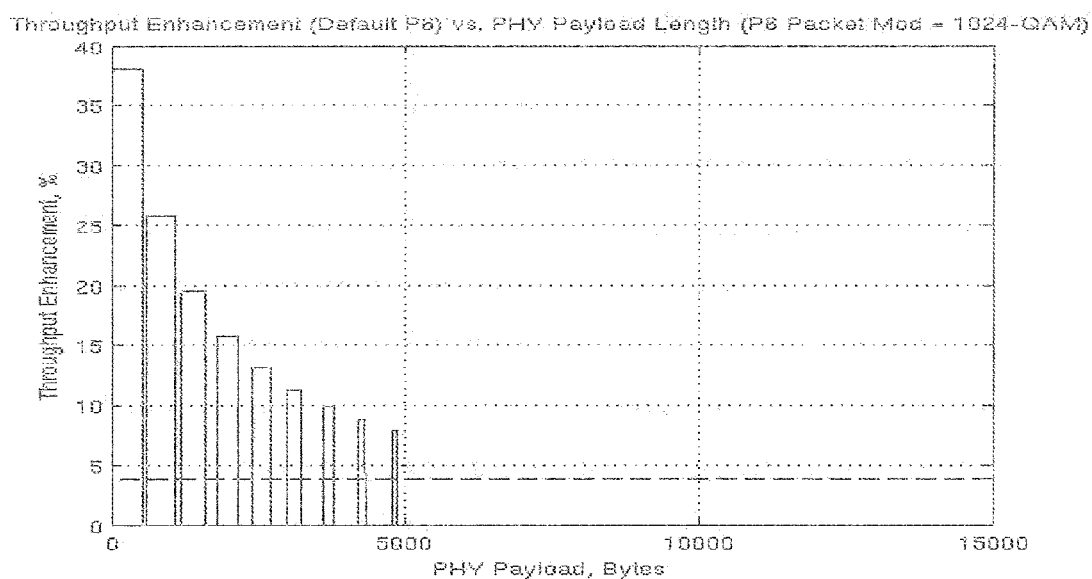

FIG. 5 is a flowchart illustrating a method 500 of selecting a unicast high-speed profile. This method 500 is compatible with the current MoCA 2.0 standard specifications without modifications. However, the method 500 requires the cooperation of two communicating nodes on the use of the unicast high-speed profiles. The NPER and VLPER unicast profiles that are defined in the standard can be utilized. This method 500 uses just one unicast profile for both NPER and VLPER packets because the performance of NPER and VLPER unicast profiles is similar. So the legacy NPER can be used for NPER and VLPER unicast profiles using Type P5 preamble, and the other legacy profile of VLPER unicast profile, which is available in the MoCA 2.0 standard, can be used for NPER and VLPER unicast profiles using Type P6 preamble.

The standard defines an Error Vector Magnitude (EVM) probe which is used to determine the optimum modulation per subcarrier. A transmit node, e.g., the transmitter 100, sends an EVM probe or a couple of EVM probes to a receiving node, e.g., the receiver 200. In an embodiment, the EVM Probe can be read from a memory in parallel to the LDPC encoder 110, and pass thru 120, the switch 130 to the OFDM modulator. At the beginning of the EVM probe, the preamble is sent first through the switch 130.

The receiving node uses the EVM probe(s) to estimate the EVM (or equivalently the signal-to-noise ratio (SNR)) per subcarrier. Based on the EVM per subcarrier, a EVM processor (not shown) in the receiving node derives the modulation per subcarrier for NPER and VLPER unicast high-speed profiles based on EVM or noise per subcarrier. The receiving node sends the modulations per subcarrier to the transmitting node for NPER and VLPER high-speed unicast profiles via a Unicast Bitloading Report. The Unicast Bitloading Report includes also the preamble type that must be used for transmissions using this profile.

In order to enhance the throughput, the receiving node can use a Vendor Specific Report, which defines packets that are used to send control information or messages between two nodes, to send the modulations per subcarrier for NPER and VLPER high-speed unicast profiles using Type P5 preamble using the current NPER unicast high-speed profile, and the modulations per subcarrier for NPER and VLPER profiles using Type P6 preamble using the current VLPER unicast high-speed profile.

To keep the use of separate unicast high-speed profiles for NPER and VLPER, we can modify the MoCA 2.0 standard specifications by adding two new high-speed profiles thereby yielding a total of 4 unicast high-speed profiles. Two unicast high-speed profiles will support NPER packets where one profile will use Type P5 preamble and the other profile will use Type P6 preamble. The other two unicast high-speed profiles will support VLPER, where one profile will use Type P5 preamble and the other one Type P6 preamble.

The transmitter 100 sends a EVM Probe Report with the derived modulations per subcarrier for the 4 unicast high-speed profiles:

1. NPER Unicast high-speed Profile that uses Type P5 Preamble
2. NPER Unicast high-speed Profile that uses Type P6 Preamble
3. VLPER Unicast high-speed Profile that uses Type P5 Preamble
4. VLPER Unicast high-speed Profile that uses Type P6 Preamble The channel estimation process at the receiver is based on the channel estimation (CE) sequence of the preamble. The equalizer coefficients are derived from conventional channel estimation for Type P5 and Type P6 preambles. The equalizer coefficients based on Type P5 preamble may be less accurate than the ones based on the longer Type P6 preamble. The lower quality of the equalizer coefficients reduces the performance by about 3 dB. Therefore, in order to have similar performance, the unicast high-speed profile that uses Type P5 preamble should have lower modulations per subcarrier relative to the unicast high-speed profile that uses Type P6 preamble. Since the performance of the unicast high-speed profile using Type P5 preamble is reduced by about 3 dB due to the equalizer coefficients quality, it's expected that the modulations of the subcarriers will be reduced by about 1 bit relative to the unicast high-speed profile that uses Type P6 preamble. On one hand, the use of Type P5 preamble reduces the duration of the preamble and as a result it reduces the total size of the packet. However, on the other hand, the reductions of the modulations per subcarrier cause an increase in the duration of the payload portion of the packet.

When a node gets a packet for transmission, a CPU or other relevant hardware, can select the unicast high-speed profile out of the two possible unicast high-speed profiles that yields the shorter transmission duration. Then, the transmitter 100 of the node transmits a bandwidth Reservation Request (RR) to the NC (Network Controller) that includes the information of the selected unicast high-speed profile number (or which unicast high-speed profile was selected). Note that within the Reservation Request, the requesting node includes, among other parameters, the selected modulation profile number and the transmission duration. The transmitter node computes the expected packet length using the two possible unicast high-speed profiles, where one uses Type P5 preamble and the other one uses Type P6 preamble. The profile that achieves the shorter transmission duration is selected by a node's CPU or other relevant hardware, and is included in the reservation request message.

Method 500 comprises receiving (510) a new packet to transmit. Computing (520) a PHY payload. Then, simultaneously or sequentially calculating (530, 540) packet duration using P5 and P6 preambles. The durations are then compared (550) and a bandwidth reservation request indicating profile with shorter duration is sent (560). The method 500 then ends.

FIG. 6-FIG. 23 are plots illustrating throughput enhancement using embodiments of the inventions. For simplification, the throughput enhancement analysis assumes the following:
1) the cyclic prefix (CP) length is 128 samples which corresponds to channel impulse response length of about 1 micro-second,
2) the modulation of the unicast high-speed profile that uses Type P6 preamble is higher by one bit relative to the modulation of the unicast high-speed profile that uses Type P5 preamble,
3) all the 480 subcarriers have the same modulation.

The throughput enhancement is calculated relative to conventional profiles:
1) the conventional unicast high-speed profile uses Type P5 preamble,
2) the conventional unicast high-speed profile uses Type P6 preamble.

In FIG. 6-FIG. 14, the throughput enhancement of an embodiment is compared to the conventional case where the unicast high-speed profile uses Type P5 preamble. Specifically, the throughput enhancement is shown for different modulations as a function of the payload size in bytes. It's clear that when the packet is very long the effect of the preamble length is negligible. However, as the packet duration is shorter, the length of the preamble affects the total packet duration and the throughput enhancement is reduced, as shown in the next plots. That is, the throughput enhancement diminishes as the packet length gets smaller.

The throughput enhancement is given by:

$$\text{Throughput\_Enhancement} = \frac{\text{Packet\_Length(Type } P5 \text{ Preamble)} - \text{Packet\_Length(ProposedScheme)}}{\text{Packet\_Length(ProposedScheme)}}$$

The achievable maximum throughput enhancement reaches 100% for very long packets and when the modulation of the proposed unicast high-speed profile that uses Type P6 preamble is QPSK. Also it's assumed that in order to keep the same performance, the modulation of the conventional high-speed profile, which uses Type P5 preamble, is BPSK. The effect of the preamble length is negligible for very long packets. Therefore, the throughput enhancement is proportional to the modulation ratio only. The throughput enhancement for very long packets that use the modulation of QPSK relative to BPSK reaches 100%.

$$\text{Throughput\_Enhancement} = \frac{QPSK \text{ (bits/subcarrier)}}{BPSK \text{ (bits/subcarrier)}} = \frac{2}{1} = 2$$

The throughput enhancement diminishes as the profile uses higher modulation. The throughput enhancement for very long packets that use the modulation of 1024-QAM relative to the conventional profile that uses 512-QAM (1 bit reduction because it uses Type P5 preamble) reaches 11%.

$$\text{Throughput\_Enhancement} = \frac{1024 \, QAM \text{ (bits/subcarrier)}}{512 \, QAM \text{ (bits/subcarrier)}} = \frac{10}{9} = 1.11$$

In FIG. 15-FIG. 23, the throughput enhancement of an embodiment is compared relative to the conventional case where the unicast high-speed profile uses Type P6 preamble.

The throughput enhancement is given by:

$$\text{Throughput\_Enhancement} = \frac{\text{Packet\_Length(Type } P6 \text{ Preamble)} - \text{Packet\_Length(ProposedScheme)}}{\text{Packet\_Length(ProposedScheme)}}$$

The maximum throughput enhancement reaches 38% for short packets where the payload occupies only one OFDM symbol.

The duration of a short packet where its payload occupies one OFDM symbol, which uses the conventional unicast high-speed profile that uses Type P6 preamble, is given by:

Packet Length($P6$)=$CP_0$+2·CE+CP+OFDM_Symbol

Packet Length($P6$)=192+2·512+128+512=1856 Samples

The duration of a short packet where its payload occupies one OFDM symbol, which uses an embodiment of the invention, will use the unicast high-speed profile that has Type P5 preamble because it's shorter than the packet that its payload occupies one OFDM symbol and uses Type P6 preamble. Note that although the modulation of the payload of the packet that uses Type P5 preamble is reduced by one, it's assumed that the payload is adequately short and it still uses one OFDM symbol. The packet duration of the proposed scheme is given by:

Packet Length($P6$)=$CP_0$+CE+CP+OFDM_Symbol

Packet Length($P6$)=192+512+128+512=1344 Samples

Therefore, the throughput improvement for short packets reaches 38%:

$$\text{Throughput\_Enhancement} = \frac{\text{Packet Length } (P6) - \text{Packet Length } (P5)}{\text{Packet Length } (P5)}$$

$$\text{Throughput\_Enhancement} = \frac{1856 - 1344}{1344} = 0.38$$

However, for very long packets where the effect of the short Type P5 preamble relative to Type P6 preamble diminishes, there is no throughput enhancement, as shown in the plots.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method in a first node of a network, the method comprising:
    maintaining a plurality of unicast profiles each of which is provided with a first or second type preamble;
    computing a first packet duration when using a first unicast profile with the first type preamble and a second packet duration when using a second unicast profile with the second type preamble;
    comparing the first and second packet durations so as to determine one from the first and second unicast profiles which yields a shorter packet duration;
    sending a packet to a second node using the determined unicast profile; and
    generating and sending a resource request to a control node, the resource request notifying the determined unicast profile and the shorter packet duration determined through the comparison.

2. The method of claim 1, wherein a unicast profile is used as a nominal packet error rate unicast profile, a very low packet error rate unicast profile, or both.

3. The method of claim 1, further comprising:
    sending a channel estimation signal to the second node; and
    receiving a channel estimation report from the second node which indicates a modulation type for each subcarrier of each unicast profile,
    wherein sending the packet to the second node further comprises sending the packet to the second node by further using the indicated modulation type for each subcarrier for the determined unicast profile.

4. The method of claim 1,
wherein sending the packet further comprises sending the packet to the second node with resources granted by the control node by using the determined unicast profile.

5. The method of claim 1, wherein the first preamble has a different length from the second preamble, and
wherein the first unicast profile uses a higher modulation than the second unicast profile if the first preamble is longer than the second preamble, and the first unicast profile uses a lower modulation than the second unicast profile if the first preamble is shorter than the second preamble.

6. The method of claim 1, wherein Multimedia over Coax Alliance standard is employed in said network.

7. The method of claim 1, wherein each modulation type includes one of the following:
BPSK, QPSK, 8-QAM, 16-QAM, 32-QAM, 64-QAM, 128-QAM, 256-QAM, 512-QAM and 1024-QAM.

8. The method of claim 1, further comprising:
receiving a channel estimation signal from a third node;
estimating characters of a channel between the first and the third nodes;
determining a modulation type of each subcarrier for each unicast profile based on the channel estimation; and
generating and sending to the third node a channel estimation report indicating the determined modulation type of each subcarrier for each unicast profile.

9. A method in a first node of a network, the method comprising:
maintaining a plurality of unicast profiles each of which is provided with a first or second type preamble;
computing a first packet duration when using a first unicast profile with the first type preamble and a second packet duration when using a second unicast profile with the second type preamble;
comparing the first and second packet durations so as to determine one from the first and second unicast profiles which yields a shorter packet duration; and
sending a packet to a second node using the determined unicast profile,
wherein computing packet durations comprises:
computing a first nominal packet error rate (NPER) packet duration when using a first nominal packet error rate unicast profile with the first type preamble and a second nominal packet error rate packet duration when using a second nominal packet error rate unicast profile with the second type preamble, wherein the comparing further comprises comparing the first and second nominal packet error rate packet durations so as to determine one from the first and second nominal packet error rate unicast profiles which yields a shorter packet duration; and
computing a first very low packet error rate (VLPER) packet duration when using a first very low packet error rate unicast profile with the first type preamble and a second very low packet error rate packet duration when using a second very low packet error rate unicast profile with the second type preamble, wherein the comparing further comprises comparing the first and second very low packet error rate packet durations so as to determine one from the first and second very low packet error rate unicast profiles which yields a shorter packet duration.

10. The method of claim 9 wherein maintaining the plurality of unicast profiles comprises:
maintaining two unicast profiles, one of which is provided with the first type preamble and used as both the first nominal packet error rate unicast profile and the first very low packet error rate unicast profile, the other of which is provided with the second type preamble and used as both the second nominal packet error rate unicast profile and the second very low packet error rate unicast profile.

11. The method of claim 9, wherein maintaining the plurality of unicast profiles comprises:
maintaining four unicast profiles, a first one of which is provided with the first type preamble and used as the first nominal packet error rate unicast profile, a second one of which is provided with the second type preamble and used as the second nominal packet error rate unicast profile, a third one of which is provided with the first type preamble and used as the first very low packet error rate unicast profile, and a fourth one of which is provided with the second type preamble and used as the second very low packet error rate unicast profile.

12. A node in a network, the node comprising:
a storage device configured to maintain a plurality of unicast profiles each of which is provided with a first or second type preamble;
a processing unit configured to compute a first packet duration when using a first unicast profile with the first type preamble and a second packet duration when using a second unicast profile with the second type preamble, and compare the first and second packet durations to determine one from the first and second unicast profiles which yields a shorter packet duration; and
a transmitter coupled to the processing unit and configured to send a packet to the other node by using the determined unicast profile,
wherein the processing unit is further configured to generate a resource request notifying the determined unicast profile and the shorter packet duration determined through the comparison.

13. The node of claim 12, wherein a unicast profile is used as a nominal packet error rate unicast profile, a very low packet error rate unicast profile, or both.

14. The node of claim 12, wherein the transmitter is further configured to send a channel estimation signal to the other node;
the node further comprises a receiver configured to receive a channel estimation report from the other node which indicates a modulation type for each subcarrier of each unicast profile; and
the transmitter is further configured to send the packet to the other node by further using the indicated modulation type for each subcarrier for the determined unicast profile.

15. The node of claim 12, wherein
the transmitter is further configured to send the generated resource request to a control node, and send the packet to the other node with resources granted by the control node by using the determined unicast profile.

16. The node of claim 12, wherein the first preamble has a different length from the second preamble; and
the first unicast profile uses a higher modulation than the second unicast profile if the first preamble is longer than the second preamble, and the first unicast profile uses a lower modulation than the second unicast profile if the first preamble is shorter than the second preamble.

17. The node of claim 12, wherein the processing unit is further configured to:
compute a first nominal packet error rate (NPER) packet duration when using a first nominal packet error rate unicast profile with the first type preamble and a second nominal packet error rate packet duration when using a second nominal packet error rate unicast profile with the second type preamble;

compare the first and second nominal packet error rate packet durations so as to determine one from the first and second nominal packet error rate unicast profiles which yields a shorter packet duration;

compute a first very low packet error rate (VLPER) packet duration when using a first very low packet error rate unicast profile with the first type preamble and a second very low packet error rate packet duration when using a second nominal packet error rate unicast profile with the second type preamble; and compare the first and second very low packet error rate packet durations so as to determine one from the first and second very low packet error rate unicast profiles which yields a shorter packet duration.

18. The node of claim 17, wherein the storage device is configured to maintain two unicast profiles, one of which is provided with the first type preamble and used as both the first nominal packet error rate unicast profile and the first very low packet error rate unicast profile, the other of which is provided with the second type preamble and used as both the second nominal packet error rate unicast profile and the second very low packet error rate unicast profile.

19. The node of claim 17, wherein the storage device is configured to maintain four unicast profiles, a first one of which is provided with the first type preamble and used as the first nominal packet error rate unicast profile, a second one of which is provided with the second type preamble and used as the second nominal packet error rate unicast profile, a third one of which is provided with the first type preamble and used as the first very low packet error rate unicast profile, and a fourth one of which is provided with the second type preamble and used as the second very low packet error rate unicast profile.

20. The node of claim 12, wherein the receiver is further configured to receive a channel estimation signal from one another node;

the processor is further configured to estimate characters of a channel between the node and the another node, determine a modulation type of each sub carrier for each unicast profile based on the channel estimation, generate a channel estimation report indicating the determined modulation type of each subcarrier for each unicast profile; and the transmitter is further configured to send the generated channel estimation report to the another node.

* * * * *